(12) United States Patent
Kim et al.

(10) Patent No.: US 9,078,246 B2
(45) Date of Patent: Jul. 7, 2015

(54) SCHEDULING METHOD IN MULTIPLE ACCESS SYSTEM AND APPARATUS USING THE SAME

(71) Applicant: LG ELECTRONICS INC., Seoul (KR)

(72) Inventors: Ki Jun Kim, Anyang (KR); Min Uk Kim, Pohang (KR); Jeong Ho Yeo, Pohang (KR); Young Yun Kang, Pohang (KR); Yeo Hun Yun, Pohang (KR); Joon Ho Cho, Pohang (KR)

(73) Assignees: LG Electronics Inc., Seoul (KR); Postech Academy-Industry Foundation, Pohang-si (KR)

( * ) Notice: Subject to any disclaimer, the term of this patent is extended or adjusted under 35 U.S.C. 154(b) by 110 days.

(21) Appl. No.: 13/912,053

(22) Filed: Jun. 6, 2013

(65) Prior Publication Data

US 2013/0329659 A1 Dec. 12, 2013

Related U.S. Application Data

(60) Provisional application No. 61/656,529, filed on Jun. 7, 2012.

(51) Int. Cl.

| | | |
|---|---|---|
| H04W 72/04 | (2009.01) | |
| H04W 72/10 | (2009.01) | |
| H04L 5/00 | (2006.01) | |
| H04L 25/00 | (2006.01) | |
| H04L 25/03 | (2006.01) | |
| H04J 11/00 | (2006.01) | |
| H04L 27/26 | (2006.01) | |

(52) U.S. Cl.
CPC .............. *H04W 72/04* (2013.01); *H04W 72/10* (2013.01); *H04L 5/003* (2013.01); *H04L 5/00* (2013.01); *H04L 25/00* (2013.01); *H04L 25/03834* (2013.01); *H04J 11/0036* (2013.01); *H04L 5/0037* (2013.01); *H04L 27/2636* (2013.01); *H04L 27/2691* (2013.01)

(58) Field of Classification Search
None
See application file for complete search history.

(56) References Cited

U.S. PATENT DOCUMENTS

| | | | | |
|---|---|---|---|---|
| 2006/0028976 | A1* | 2/2006 | Park et al. | 370/203 |
| 2007/0237248 | A1* | 10/2007 | Jung et al. | 375/260 |
| 2008/0008206 | A1* | 1/2008 | Cho et al. | 370/430 |
| 2008/0170633 | A1* | 7/2008 | Karino | 375/260 |
| 2009/0147748 | A1* | 6/2009 | Ofuji et al. | 370/330 |
| 2010/0296385 | A1* | 11/2010 | Li | 370/210 |
| 2013/0100920 | A1* | 4/2013 | Nakamura et al. | 370/329 |

FOREIGN PATENT DOCUMENTS

WO WO 2012/002382 * 1/2012

* cited by examiner

*Primary Examiner* — Kerri Rose
(74) *Attorney, Agent, or Firm* — McKenna Long & Aldridge LLP

(57) ABSTRACT

A method for transmitting data streams by a transmitter in a wireless communication system is provided. The transmitter performs Fourier transform for a data stream to generate a transformed stream. The transmitter repeats the transformed stream to generate a repeated stream. The transmitter maps the repeated stream on a plurality of subcarriers to generate a transmission signal. The transmitter transmits the transmission signal to a receiver. The plurality of subcarriers are selected by starting from a subcarrier having a predetermined index and hopping at a subcarrier interval.

12 Claims, 16 Drawing Sheets

SCHEDULING METHOD IN MULTIPLE ACCESS SYSTEM AND APPARATUS USING THE SAME

CROSS-REFERENCE TO RELATED APPLICATIONS

This application claims the benefit of priority of U.S. Provisional Application No. 61/656,529, filed on Jun. 7, 2012, which is incorporated by reference herein in its entirety.

BACKGROUND OF THE INVENTION

1. Field of the Invention

The present invention relates to wireless communications, and more particularly, to a method and apparatus for optimum scheduling in a wireless multiple access system.

2. Related Art

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc. A cellular network supporting a multiple access scheme includes various channels such as broadcast channel, a multiple access channel, relay cannel, interference channel.

Meanwhile, with the significant development of a wireless communication technology, users using the wireless communication have been gradually increased and interference per cell has been gradually increased. There is a need for a method to efficiently remove the above interference. Furthermore, there is a demand for a method for transmitting a signal by a transmitter so that a receiver easily removes interference.

SUMMARY OF THE INVENTION

The present invention provides a method for separating signals of each user by allocating user to different subcarriers such as existing single carrier-frequency division multiple access (SC-FDMA) or interleaved frequency division multiple access (IFDMA).

The present invention further provides a method for easily removing interference between signals of multi-users based on spectral correlation embedded in a transmission signal in a communication scenario where the signals of multi-users having different cycle periods.

The present invention easily removes interference as compared with an existing method and provides an interval determining a subcarrier as a parameter by generating a signal having spectral correlation in a frequency domain, and increases channel diversity by adjusting the number and an interval of subcarriers used by each user.

Furthermore, the present invention simply implement a system by providing a method for efficiently distributing available subcarriers in a given frequency band to multi-users.

In an aspect, a method for transmitting data streams in a wireless communication system. The method comprises steps of: performing Fourier transform for a data stream to generate a transformed stream, repeating the transformed stream to generate a repeated stream, mapping the repeated stream on a plurality of subcarriers to generate a transmission signal, and transmitting the transmission signal to a receiver. The plurality of subcarriers are selected by starting from a subcarrier having a predetermined index and hopping at a subcarrier interval The step of mapping the repeated stream may comprise steps of: weighting the repeated stream based on a spectral weighting vector to generate a weighted stream, and performing inverse Fourier transform for the weighted stream.

The subcarrier interval may be larger than a coherence bandwidth of the wireless communication system.

The subcarrier interval may be determined based on a channel condition in the wireless communication system.

A number of the plurality of subcarriers may be determined based on a channel condition in the wireless communication system.

In another aspect, a base station for transmitting data streams in a wireless communication system is provided. The base station comprising: a radio frequency unit for receiving a radio signal and a processor, operatively coupled with the radio frequency unit. The processor is configured for: performing Fourier transform for a data stream to generate a transformed stream, repeating the transformed stream to generate a repeated stream, mapping the repeated stream on a plurality of subcarriers to generate a transmission signal, and transmitting the transmission signal to a receiver. The plurality of subcarriers are selected by starting from a subcarrier having a predetermined index and hopping at a subcarrier interval.

DESCRIPTION OF EXEMPLARY EMBODIMENTS

Hereinafter, an embodiment of the present invention will be described in detail with reference to the accompanying drawings.

Figure 1:
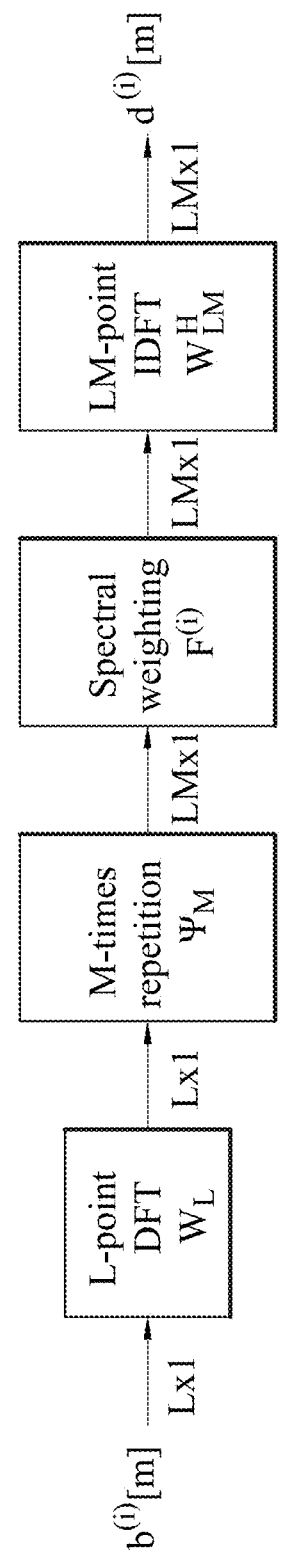
FIG. 1 illustrates a procedure which converts a data symbol vector into a precoded data symbol vector.

FIG. 1 illustrates a procedure which converts a data symbol vector into a precoded data symbol vector. In FIG. 1, a $b^{(i)}[m]$ represents a data symbol vector, and a $d^{(i)}[m]$ represents precoded data symbol vector. The i represents a user index, and the m represents a block index. The L represents a data symbol length in one block, the LM represents a bock length, and the Nc represents a cyclic prefix length.

Respective parameters in FIG. 1 may be defined by a following equation.

$$b^{(i)}[m] \triangleq \begin{bmatrix} b_0^{(i)}[m] \\ b_1^{(i)}[m] \\ \vdots \\ b_{L-1}^{(i)}[m] \end{bmatrix}$$ [Equation 1]

$$\Psi_M \triangleq \begin{bmatrix} I_L \\ I_L \\ \vdots \\ I_L \end{bmatrix}$$ [Equation 2]

$$F^{(i)} \triangleq diag\{f^{(i)}\}$$ [Equation 3]

$$d^{(i)}[m] \triangleq \begin{bmatrix} d_0^{(i)}[m] \\ d_1^{(i)}[m] \\ \vdots \\ d_{LM-1}^{(i)}[m] \end{bmatrix}$$ [Equation 4]

The $b^{(i)}[m]$ and the $d^{(i)}[m]$ in FIG. 1 have a relationship as illustrated in illustrated in a following equation 5.

$$d^{(i)}[m] = W_{LM}^{\mathcal{H}} F^{(i)} \Phi_M W_L b^{(i)}[m]$$ [Equation 5]

Meanwhile, a cycle prefix (CP) may be added to the precoded data symbol vector $d^{(i)}[m]$.

Figure 2:
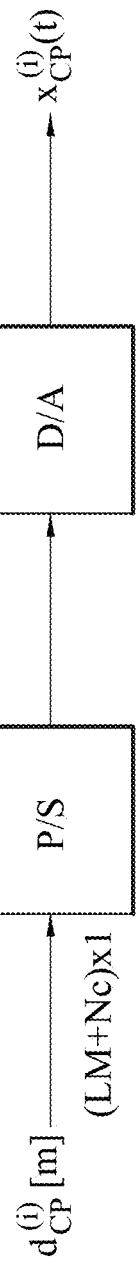
FIG. 2 illustrates an example of a procedure which converts a precoded data symbol vector to which the CP is added, into a transmission signal.

FIG. 2 illustrates an example of a procedure which converts a precoded data symbol vector to which the CP is added, into a transmission signal. The $d_{CP}^{(i)}[m]$ is the precoded data symbol vector to which the CP is added.

Referring to FIG. 2, the precoded data symbol vector to which the CP is added is serially converted and is filtered by a digital-to-analog (D/A) filter. Finally, a transmission signal $x^{(i)}(t)$ is generated. The transmission signal $x^{(i)}(t)$ may be expressed by a following equation 6.

$$x_{CP}^{(i)}(t) = \sum_{m=-\infty}^{\infty} d_{CP}^{(i)}[m]^T p_{CP}(t - mLMT)$$ [Equation 6]

where, $$p_{CP}(t) \triangleq \begin{bmatrix} p(t) \\ p(t-T) \\ \vdots \\ p(t-(LM+N_c-1)T) \end{bmatrix}.$$

Figure 3:
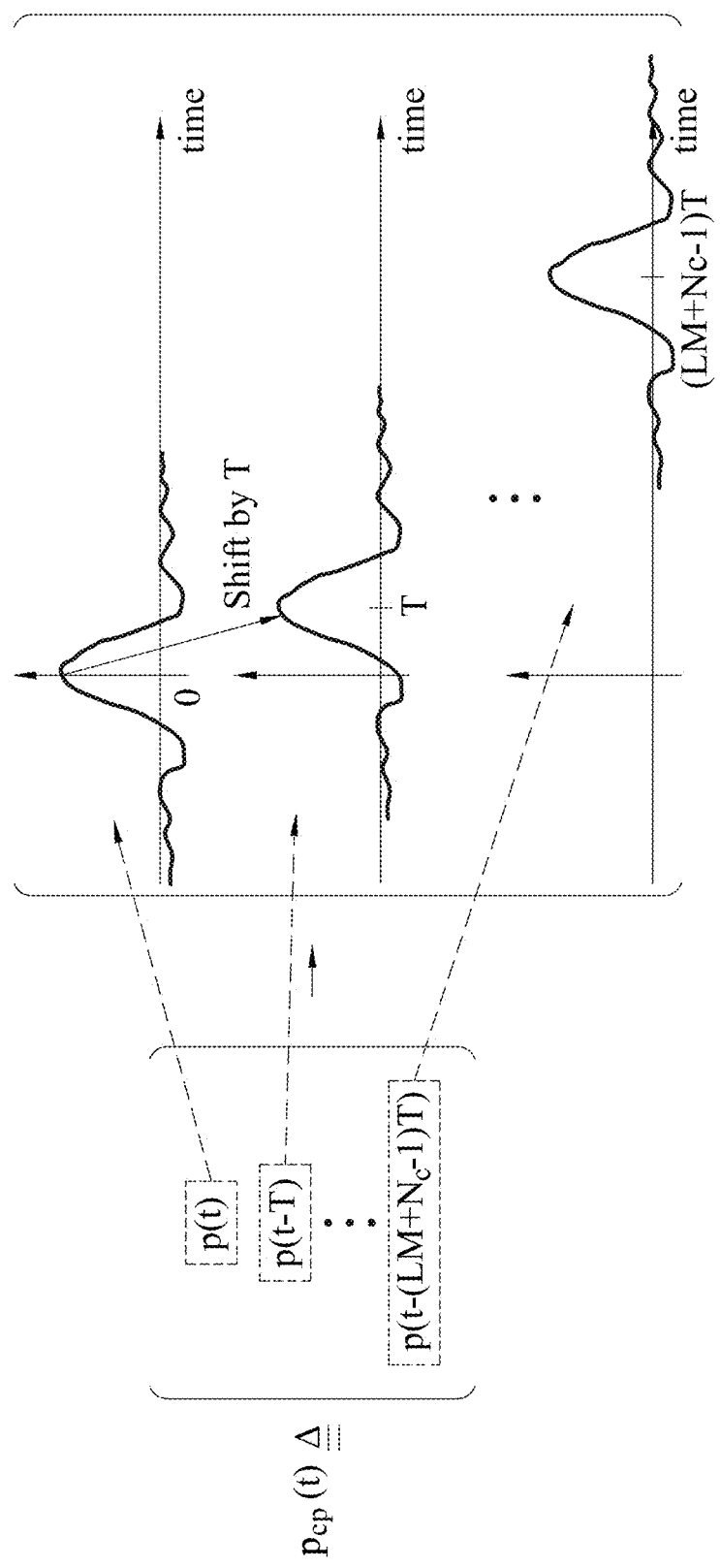
FIG. 3 illustrates an example of respective elements of pCP(t).

FIG. 3 illustrates an example of respective elements of pCP(t).

Figure 4:
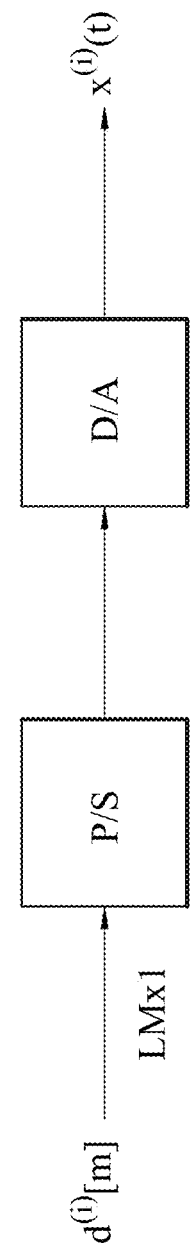
FIG. 4 illustrates an example of a procedure which converts a precoded data symbol vector into a transmission signal.

FIG. 4 illustrates an example of a procedure which converts a precoded data symbol vector into a transmission signal. Hereinafter, for the purpose of convenience of a description, it is assumed that one user transmits a single stream, and a CP is not used. A $d^{(i)}[m]$ represents the precoded data symbol vector generated by a procedure of FIG. 1.

Referring to FIG. 4, the precoded data symbol vector is serially converted and is filtered by a digital-to-analog (D/A) filter. Finally, a transmission signal $x^{(i)}(t)$ is generated. The transmission signal $x^{(i)}(t)$ may be expressed by a following equation 7.

$$x^{(i)}(t) = \sum_{m=-\infty}^{\infty} d^{(i)}[m]^T p(t - mLMT)$$ [Equation 7]

where, $$p(t) \triangleq \begin{bmatrix} p(t) \\ p(t-T) \\ \vdots \\ p(t-(LM-1)T) \end{bmatrix}.$$

According to the equation 7, it may be understood that the precoded data symbol $d^{(i)}[m]$ is pulse shaped and transmitted. In order to grasp to which pulse the data symbol $b^{(i)}[m]$ is shaped, the equation 7 may be rewritten by a following equation 8.

$$x^{(i)}(t) = \sum_{m=-\infty}^{\infty} b^{(i)}[m]^T s^{(i)}(t - mLMT)$$ [Equation 8]

The $s^{(i)}(t)$ may be expressed by a following equation 9.

$$s^{(i)}(t) \triangleq \begin{bmatrix} s_0^{(i)}(t) \\ s_1^{(i)}(t) \\ \vdots \\ s_{L-1}^{(i)}(t) \end{bmatrix}$$ [Equation 9]

$$= (W_{LM}^{\mathcal{H}} F^{(i)} \Psi_M W_L)^T p(t)$$

$$= \begin{bmatrix} \tilde{f}_0^{(i)} \ \tilde{f}_1^{(i)} \ \cdots \ \tilde{f}_{LM-1}^{(i)} \\ M \text{ circular shift of 1st row} \\ \vdots \\ (L-1)M \text{ circular shift of 1st row} \end{bmatrix}$$

$$\begin{bmatrix} p(t) \\ p(t-T) \\ \vdots \\ p(t-(LM-1)T) \end{bmatrix}$$

Figure 5:
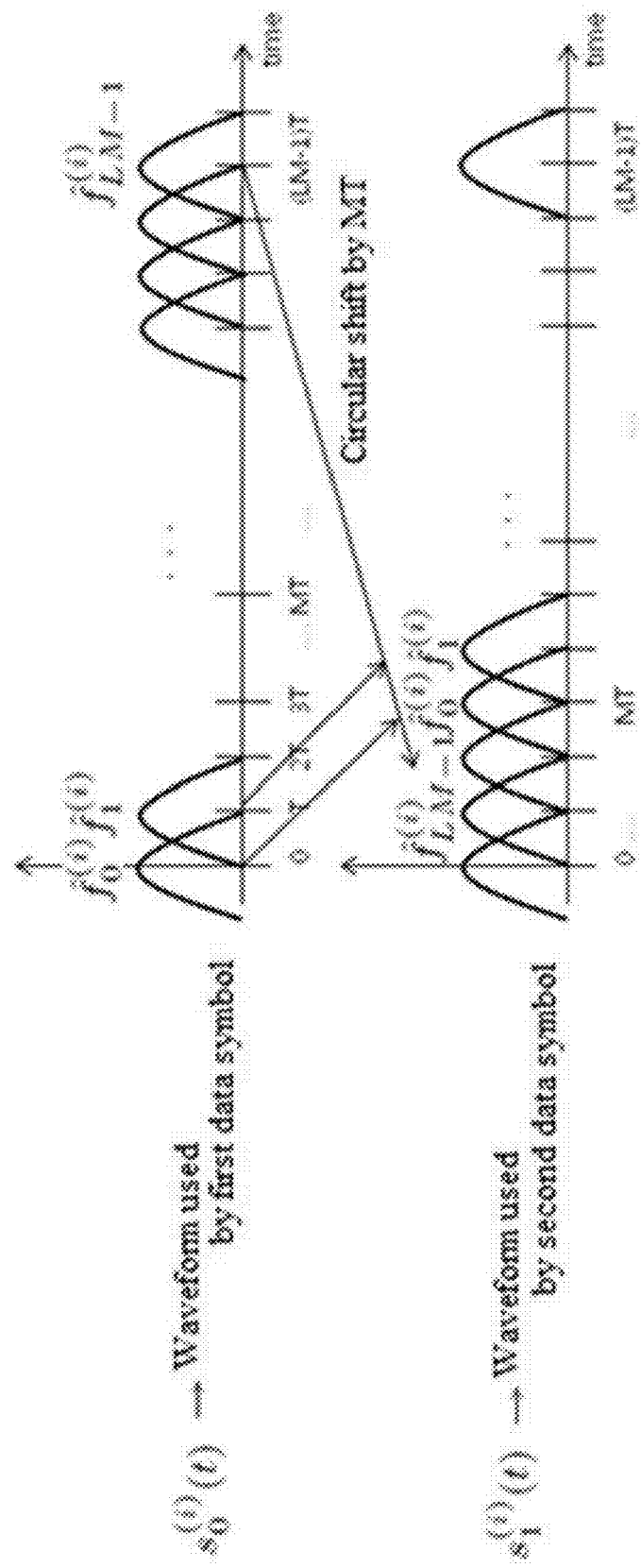
FIG. 5 illustrates an example of a symbol waveform in a time domain.

FIG. 5 illustrates an example of a symbol waveform in a time domain.

A waveform using an l-th data symbol of an i-th user may be expressed as illustrated in FIG. 5. For example, $s_0^{(i)}(t)$ is a waveform using a first data symbol of an i-th user, and $s_1^{(i)}(t)$ is a waveform using a second data symbol of the i-th user. In this case, $s_1^{(i)}(t)$ may be generated by circularly shifting $s_0^{(i)}(t)$ by MT.

The above content indicates the symbol waveform in a time domain. So as to check the symbol waveform in a frequency domain, if performing element-wise Fourier transform (FT) for $s^{(i)}(t)=\Phi_M^T W_{LM} F^{(i)} W_{LM}^{\mathcal{H}} p(t)$, a following equation 10 is obtained.

$$s^{(i)}(f) = \mathcal{F}\{s^{(i)}(t)\} \quad \text{[Equation 10]}$$
$$= \mathcal{F}\{\Phi_M^T W_{LM} F^{(i)} W_{LM}^{\mathcal{H}} p(t)\}$$
$$= \Phi_M^T W_{LM} F^{(i)} W_{LM}^{\mathcal{H}} \omega_{LM}(fT) P(f)$$

where, $$\omega_{LM}(fT) \triangleq \begin{bmatrix} e^{-j2\pi \cdot 0 \cdot fT} \\ e^{-j2\pi \cdot 1 \cdot fT} \\ \vdots \\ e^{-j2\pi(LM-1)fT} \end{bmatrix}.$$

So as to check a waveform using an l-th data symbol, if only an l-th entry of $s^{(i)}$ is rewritten to obtain a follow equation 11.

$$[s^{(i)}(f)] = \omega_{LM}^{\mathcal{H}}\left(\frac{l}{L}\right) F^{(i)} W_{LM}^{\mathcal{H}} \omega_{LM}(fT) P(f) \quad \text{[Equation 11]}$$
$$= \left[ f_0^{(i)} e^{j2\pi \frac{1}{L} \cdot 0} f_1^{(i)} e^{j2\pi \frac{1}{L} \cdot 1} \ldots f_{LM-1}^{(i)} e^{j2\pi \frac{1}{L}(LM-1)} \right]$$
$$W_{LM}^{\mathcal{H}} \omega_{LM}(fT) P(f)$$

Figure 6:
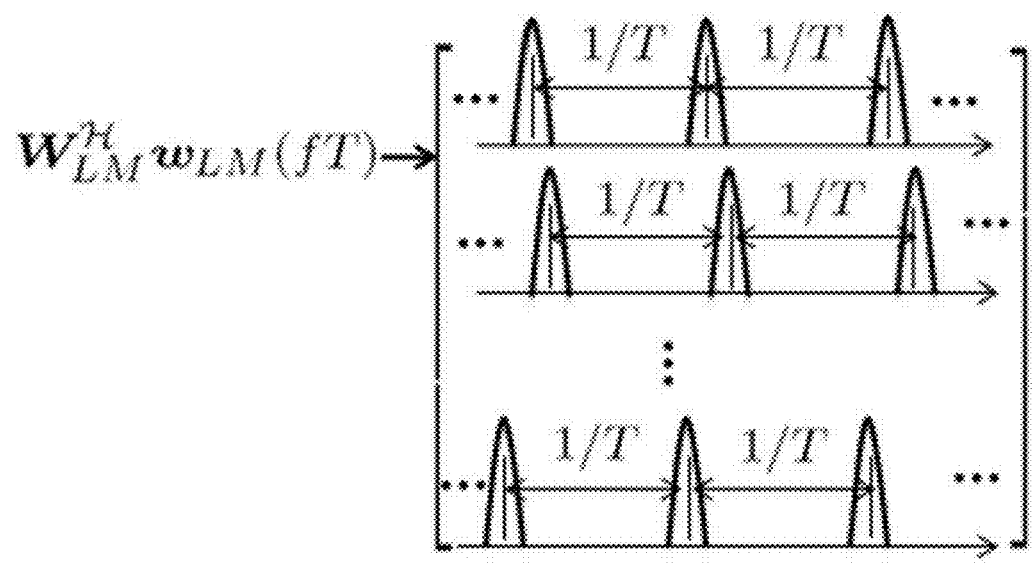
FIG. 6 illustrates $W_{LM}^H w_{LM}(fT)$ in an equation 11.

In this case, $W_{LM}^{\mathcal{H}} w_{LM}(fT)$ is expressed in FIG. 6. Accordingly, the symbol waveform in a frequency domain is illustrated in FIG. 7.

Figure 7:
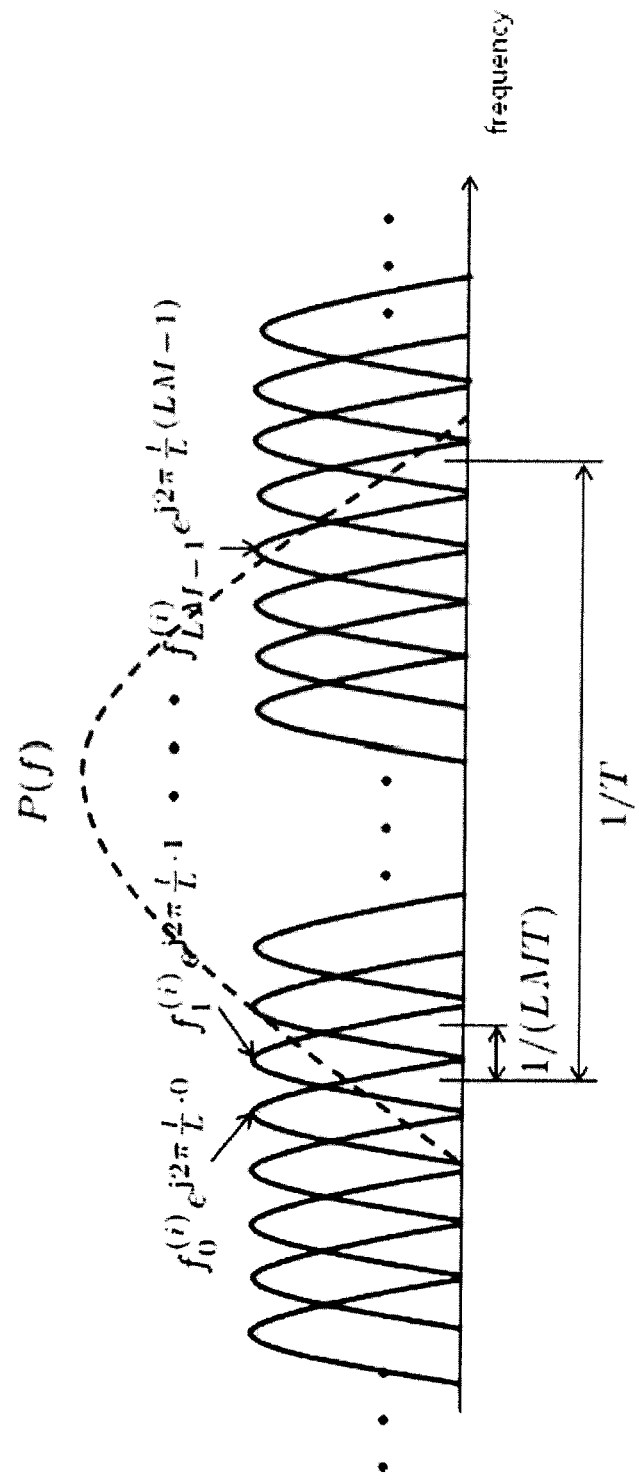
FIG. 7 illustrates an example of a symbol waveform in a frequency domain.

Referring to FIG. 7, each subcarrier of a data symbol waveform in the frequency domain is expressed by product of a spectral weighting vector and an exponential term. Since exponential terms multiplied to the subcarrier are orthogonal to each other, orthogonality between data belonging to one user may maintain. Furthermore, spectral weighting vectors are designed to be orthogonal to each other, the orthogonality between multi-users may maintain.

In the above equations, $F^{(i)}$ is a spectral weighting matrix of an i-th user, a diagonal matrix of LM×LM, and includes a plurality of spectral weighting vectors $f^{(i)}$. The vector $f^{(i)} \triangleq$ is a vector or length LM using a diagonal component of a spectral matrix as an element.

Each user selects some of LM subcarriers allocated to a given frequency band based on a spectral weighting vector. That is, when there is an element having a zero value among elements of $f^{(i)}$, a subcarrier corresponding to the position is not selected.

Hereinafter, an interval selecting a subcarrier is indicated using a variable M', and the number selecting the subcarrier is indicated using a variable L'.

Figure 8:
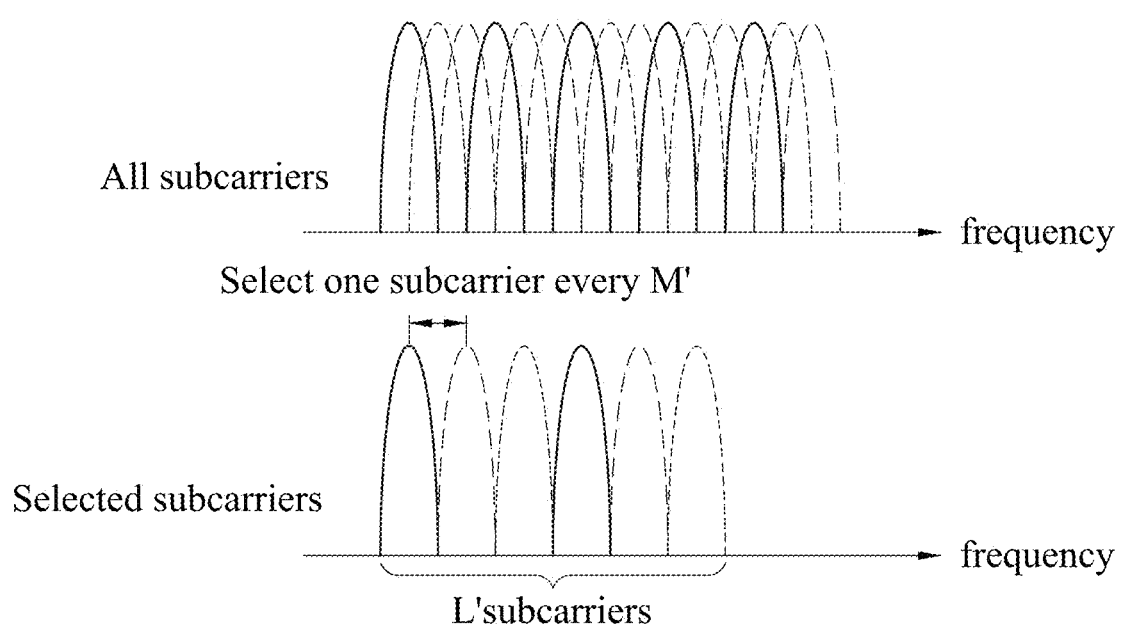
FIG. 8 illustrates a method for selecting subcarriers of a transmission signal according to the present invention.

FIG. 8 illustrates an example of selecting a subcarrier when L=3, M=5, L'=6, M'=2. Referring to FIG. 8, a subcarrier is selected from entire subcarriers every interval M'. In this case, the same discrete Fourier transform (DFT) precoded symbol is multiplied to a subcarrier of the same line. In this case, a condition which L' and M' must satisfy.

$$\text{Necessary condition} \begin{cases} \cdot \quad L \le L' \le \frac{LM}{M'} \\ \cdot \quad M' \le M, \gcd(L, M') = 1 \end{cases} \quad \text{[Equation 12]}$$

When L' and M' satisfying the condition is used, the maximum number of users which are designable so that each subcarrier does not overlap (that is, orthogonal) is expressed by a following equation 13.

$$\overline{K}_{OF} = \quad \text{[Equation 13]}$$
$$\left\lfloor \frac{LM}{L'M'} \right\rfloor M' + \max\left(0, LM - \left\lfloor \frac{LM}{L'M'} \right\rfloor L'M' - (L'-1)M'\right)$$

When a subcarrier is selected in the order of user index, an i-th user selects L' subcarriers while skipping from a subcarrier of an index given by a following equation 14 for each M' subcarriers.

$$\left\lfloor \frac{i-1}{M'} \right\rfloor M'(L'-1) + i \quad \text{[Equation 14]}$$

Meanwhile, spectral weighting vector $f^{(i)}$ used by an i-th user is determined by a value satisfying a following equation 15.

$$f_l^{(i)} = 0, \text{ if } \text{rem}\left(l - \left\lfloor \frac{i-1}{M'} \right\rfloor M'(L'-1) - i, M'\right) \ne 0 \quad \text{[Equation 15]}$$
$$f_L^{(i)}[l]^{\mathcal{H}} f_L^{(i)}[l] = 1, \forall l = 0, 1, \ldots, L-1$$

The rem(a,b) signifies a remainder obtained by diving a by b, and $f_l^{(i)}$ is an l-th element of $f^{(i)}$. $f_L^{(i)}[l]$ is defined by a following equation 16.

$$f_L^{(i)}[l] \triangleq \begin{bmatrix} f_l^{(i)} \\ f_{l+L}^{(i)} \\ \vdots \\ f_{l+L(M-1)}^{(i)} \end{bmatrix} \quad \text{[Equation 16]}$$

In the above contents, the greater an interval M' between subcarriers in a coherence bandwidth is, greater frequency diversity may be obtained. The greater the number L' of subcarriers is, inter symbol interference (ISI) and inter cell interference (ICI) are easily suppressed. However, the greater M' is, an upper bound of a value which L' may have is reduced. Furthermore, the greater L' is, the maximum number of orthogonally designed users is reduced, and the number of estimation channels is increased. Accordingly, it is necessary to select suitable L' and M' according to a channel condition.

Figure 9:
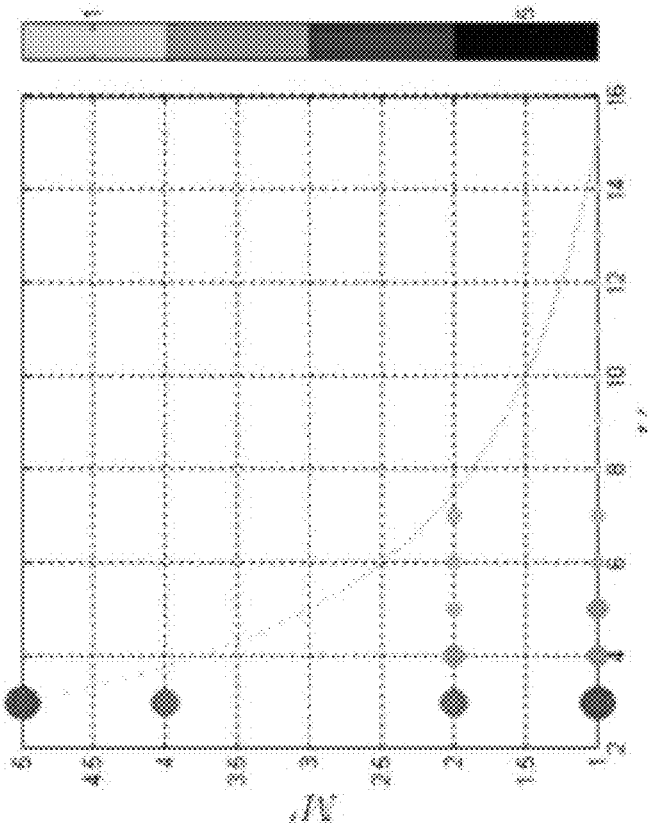
FIG. 9 illustrates an interval between usable subcarriers and the number of usable subcarriers.
Figure 9:
Figure 9:
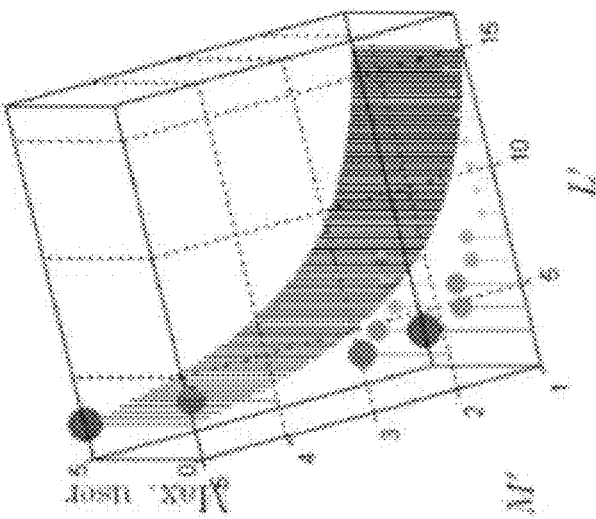

FIG. 9 illustrates an interval between available subcarriers and the number of available subcarriers.

When L and M are given, L' and M' satisfying the above necessary condition is illustrated in FIG. 9. In FIG. 9, the size of a maker and an intensity of a shade indicate the orthogonally designable maximum number of users. Referring to FIG. 9, the smaller L' is, the orthogonally designable maximum number of users with respect to fixed M' may be increased.

Figure 10:
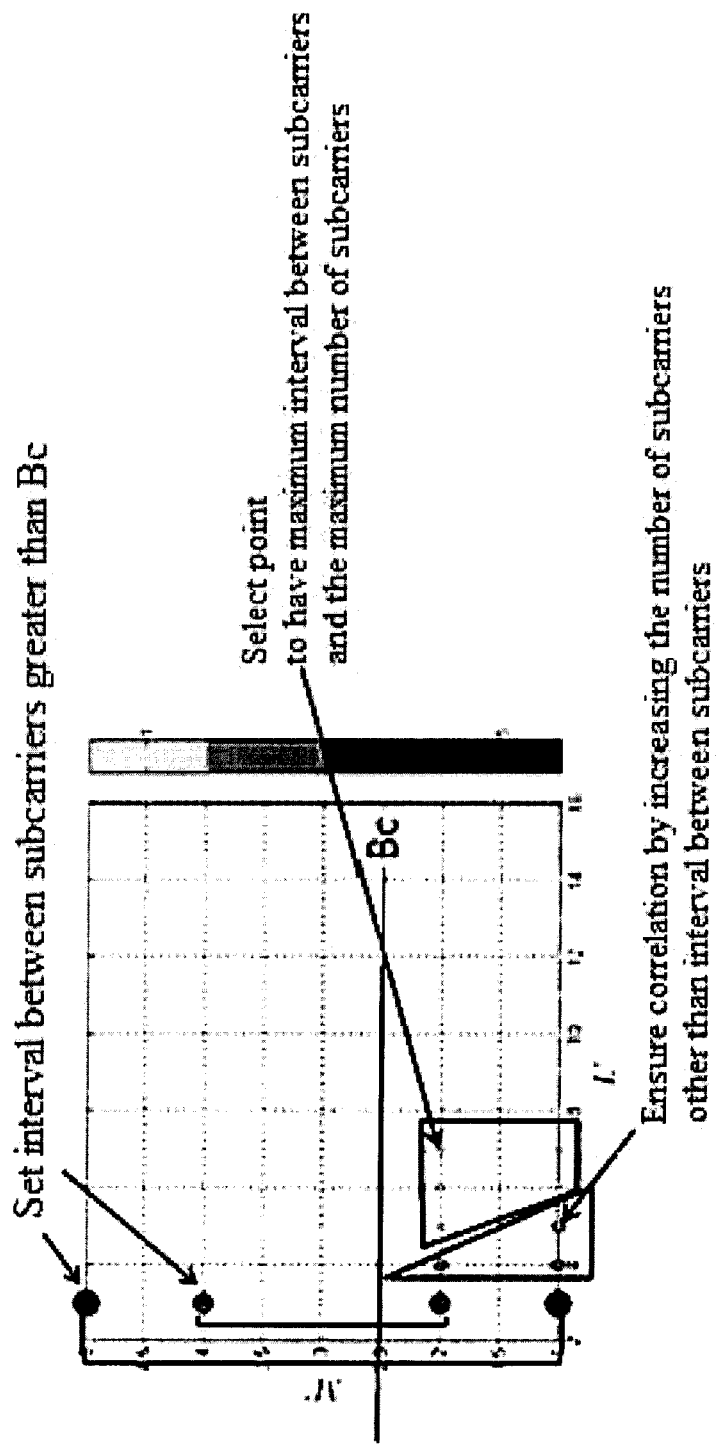
FIG. 10 illustrates a method of determining an interval between usable subcarriers and the number of usable subcarriers.

Meanwhile, points having the same maximum number of users may be grouped, and it can be determined which point of the points is an optimal point. FIG. 10 illustrates a method of determining an optimal interval between available subcarriers and the optimal number of available subcarriers.

As described above, it is preferable to select a point to have the maximum number of subcarriers while having a maximum interval between subcarriers. Furthermore, it is preferable that an interval M' between subcarriers is determined to be greater than coherence bandwidth Bc. If all usable M' in a group having the same maximum number of users is less than Bc, it is preferable to ensure spectral correlation by increasing L' other than M'.

Figure 11:
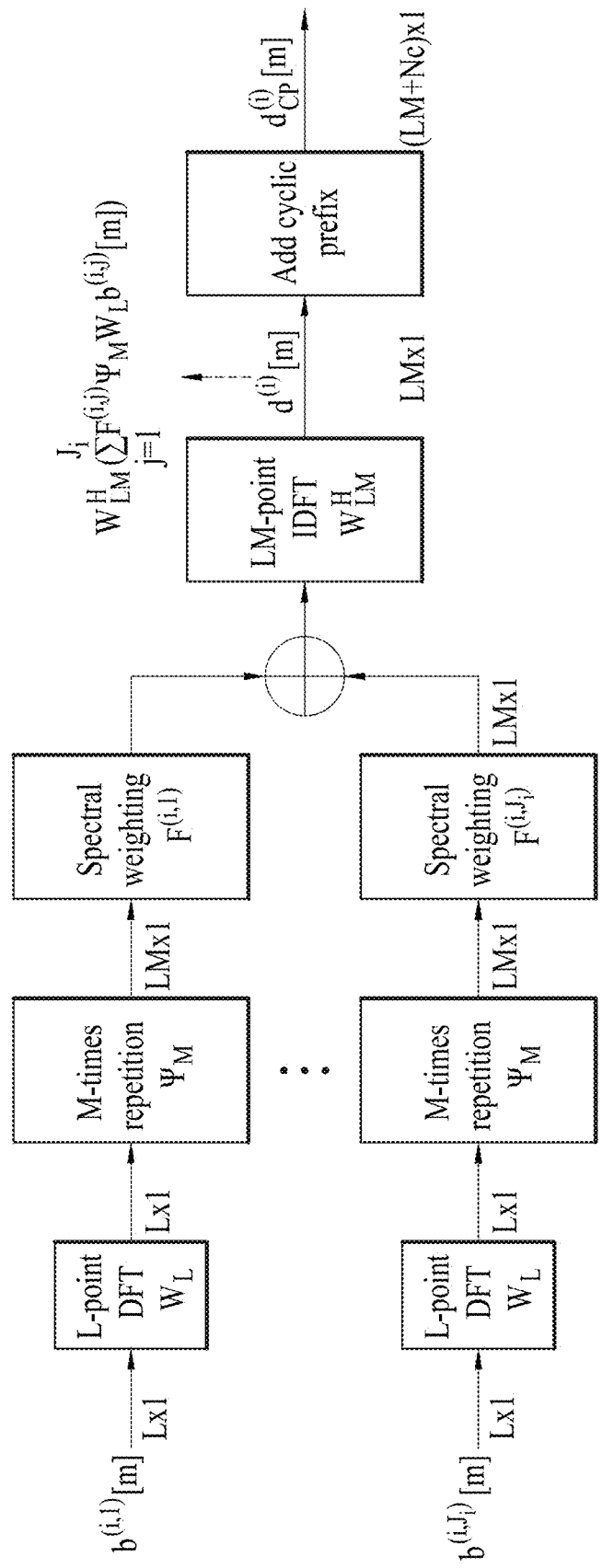
FIG. 11 illustrates a configuration of a transmitter where one user transmits a multi-stream.

FIG. 11 illustrates a configuration of a transmitter where one user transmits a multi-stream. Each stream uses different spectral weighting matrix $F^{(i,j_i)}$.

When each user uses L' and M', the maximum number of streams which one user may orthogonally transmit is given by a following equation 17.

$$J_{OF} \triangleq \left[ \frac{L'}{L} \right] \quad \text{[Equation 17]}$$

Furthermore, orthogonal conditions between respective streams are given by a following equation 18.

$$f_L^{(i,j')}[l]^{\mathcal{H}} f_L^{(i,j)}[l] = \delta_{j,j'}, \forall l = 0, 1, \ldots, L-1 \text{ where,} \quad \text{[Equation 18]}$$

$$f_L^{(i,j)}[l] \triangleq \begin{bmatrix} f_l^{(i,j)} \\ f_{l+L}^{(i,j)} \\ \vdots \\ f_{l+L(M-1)}^{(i,j)} \end{bmatrix}$$

Figure 12:
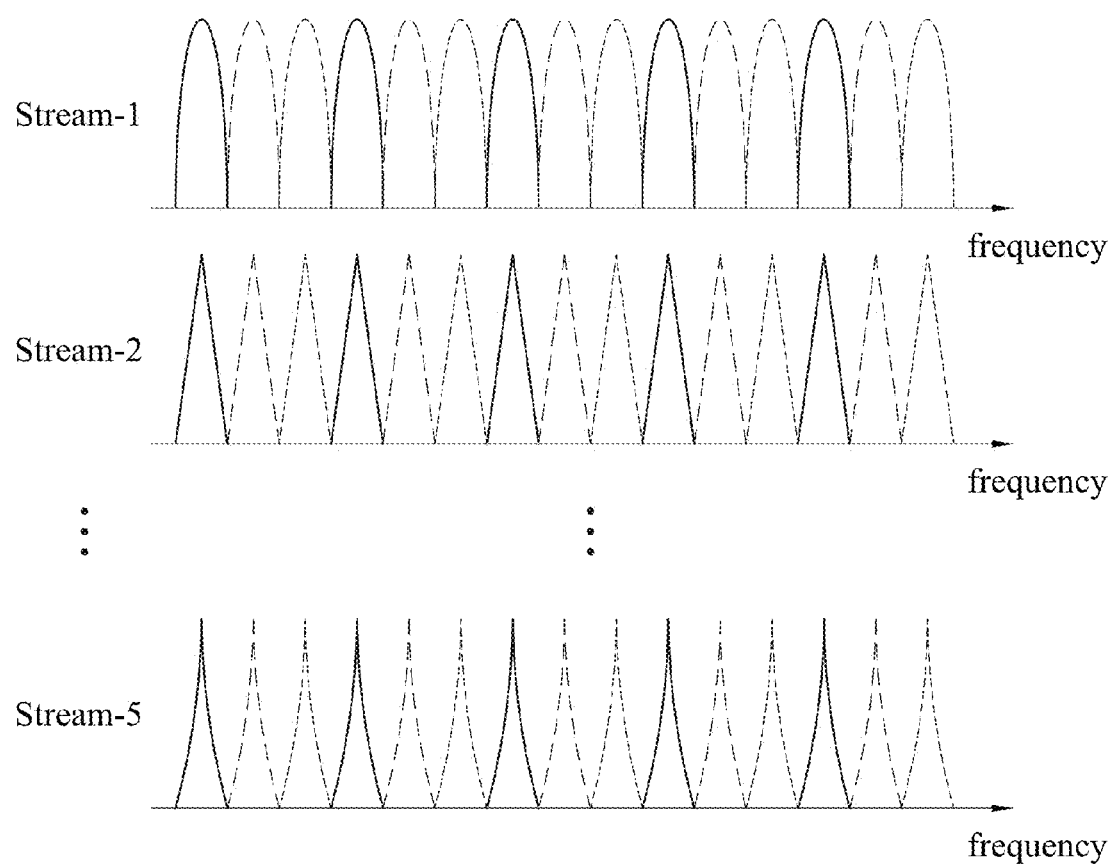
FIG. 12 illustrates an example of a subcarrier where one user transmits a multi-stream.

FIG. 12 illustrates an example of a subcarrier where one user transmits a multi-stream. In an example of FIG. 12, L=3, M=5, L'=6, M'=2, and each user may perform maximum rank 5 signaling.

Each user may transmits a stream using the maximum number of streams which the user can transmit, that is, all ranks, and may perform rank-one signaling transmitting one stream. Each case has following characteristics.

Figure 13:
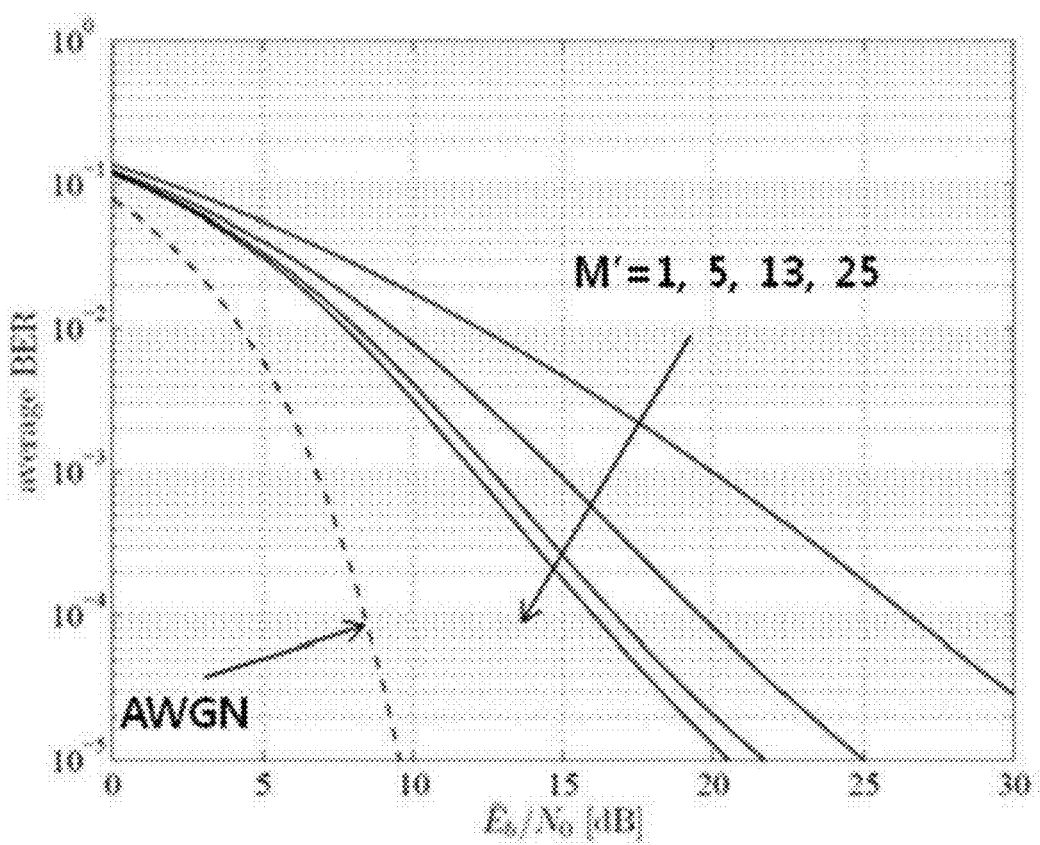
FIG. 13 illustrates a bit error rate (BER) according to an interval between subcarriers.

1) Rank-one signaling:
   the number of transmission streams is one; performance of interference suppression is high, mainly used by cell-edge user
2) Low-rank signaling:
   the number of transmission streams is 2~3
3) High-rank signaling:
   the number of transmission streams is 3~4
4) Full-rank signaling:
   the number of transmission streams is 5; used when ICI is not great (e.g., a user adjacent to base station), a high symbol rate FIG. 13 illustrates a bit error rate (BER) according to an interval between subcarriers. In an example of FIG. 13, a single stream is transmitted, and L=8, M=25, L'=12.

As described above, since the greater channel diversity is the greater an interval M' between subcarriers is, BER performance is improved. Referring to FIG. 13, as M' is increased, BER performance may be improved. In this case, if the coherence bandwidth is great, performance difference according to M' is great. If the coherence bandwidth is small, performance difference according to M' is not great.

Figure 14:
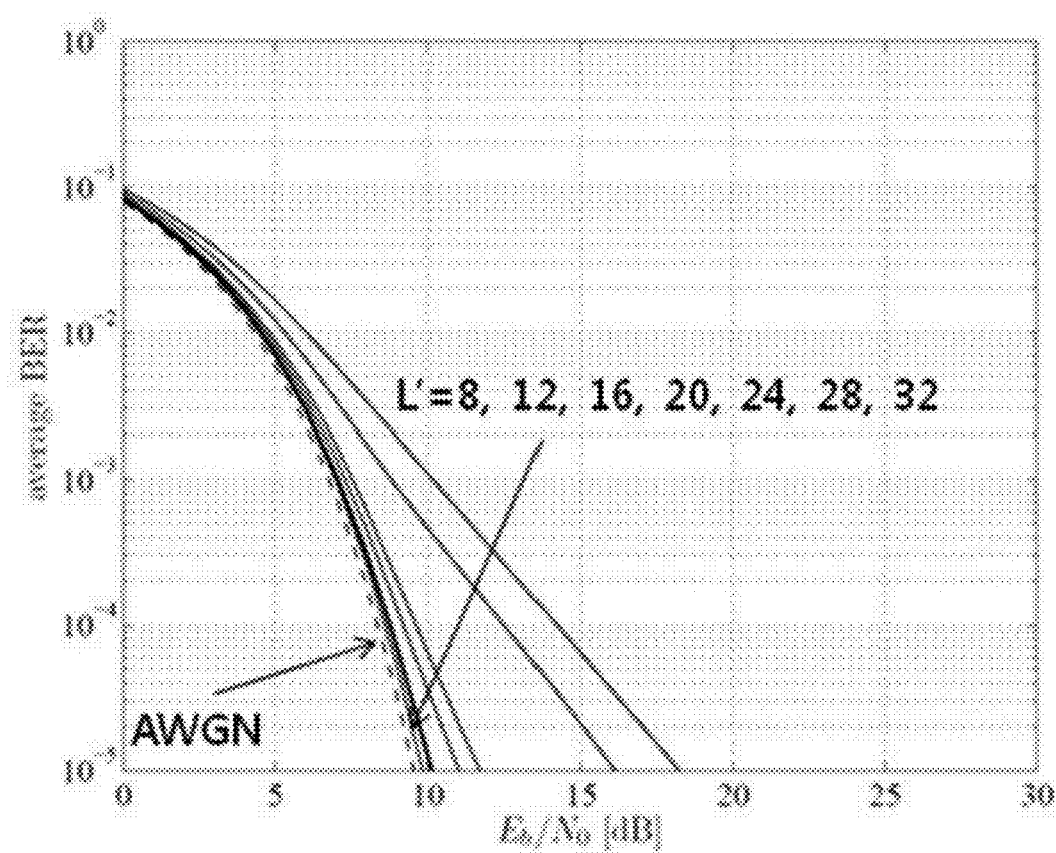
FIG. 14 illustrates BER according to the number of subcarriers. In an example of FIG. 14, a single stream is transmitted, and L=8, M=25, L'=12.

FIG. 14 illustrates BER according to the number of subcarriers. In an example of FIG. 14, a single stream is transmitted, and L=8, M=25, L'=12.

As described above, if the number L' of subcarriers is increased, interference suppression is easily performed so that BER performance is improved. Referring to FIG. 14, if the L' is increased, the BER performance may be improved. This is because a total dimension is increased in a state that a signal space is constant. If the total dimension is increased, ISI is more easily suppressed.

Figure 15:
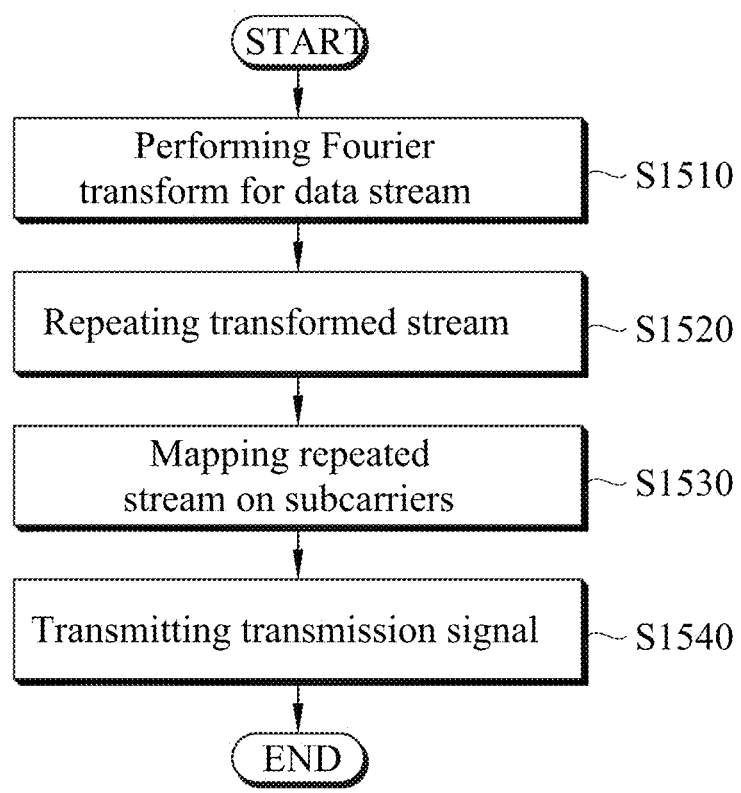
FIG. 15 illustrates a method for transmitting data streams in a wireless communication system according to an embodiment of the present invention.

FIG. 15 illustrates a method for transmitting data streams in a wireless communication system according to an embodiment of the present invention. The method for transmitting data streams in a wireless communication system according to an embodiment of the present invention may be performed by a base station and/or a wireless device communicating with the base station. That is, the method for transmitting data streams in a wireless communication system according to an embodiment of the present invention may be performed by a transmitter included in a base station and/or the wireless device. Hereinafter, for the purpose of convenience of the description, the method for transmitting data streams by the base station is described in consideration of an actual case when one base station communicate with a plurality of wireless devices.

As illustrated through FIGS. 1 and 2, a transmitter performs Fourier transform (FT) for a data stream including a data symbol vector to generate a transformed stream (S1510). For example, the transmitter may perform L-point DFT.

Furthermore, the transmitter repeats the transformed stream to generate a repeated stream (S1520). Then, the transmitter multiplies a spectral weighting vector, and may perform inverse FT. Steps S1510 and S1520 were described in detail by the above equations. For example, the spectral weighting vector may be determined using the equation 15 and 16.

The transmitter maps the repeated stream on a plurality of subcarriers to generate a transmission signal (S1530). In this case, a plurality of subcarriers, as illustrated in FIG. 8, the transmitter may select from a predetermined index from total subcarriers every interval M'. The predetermined index may be given by the equation 14, and a total L' subcarriers may be selected. An interval between subcarriers and the number of the subcarriers may be determined based on a channel condition (e.g., ISI, ICI, BER) in a wireless communication system. To achieve this, a channel may be estimated. It is preferable that an interval between subcarriers and the number of the subcarriers are M' and L' available in a channel condition. Furthermore, it is preferable that the interval between subcarriers is greater than a coherence bandwidth in the wireless communication system.

The transmitter transmit the transmission signal to a receiver (S1540).

Figure 16:
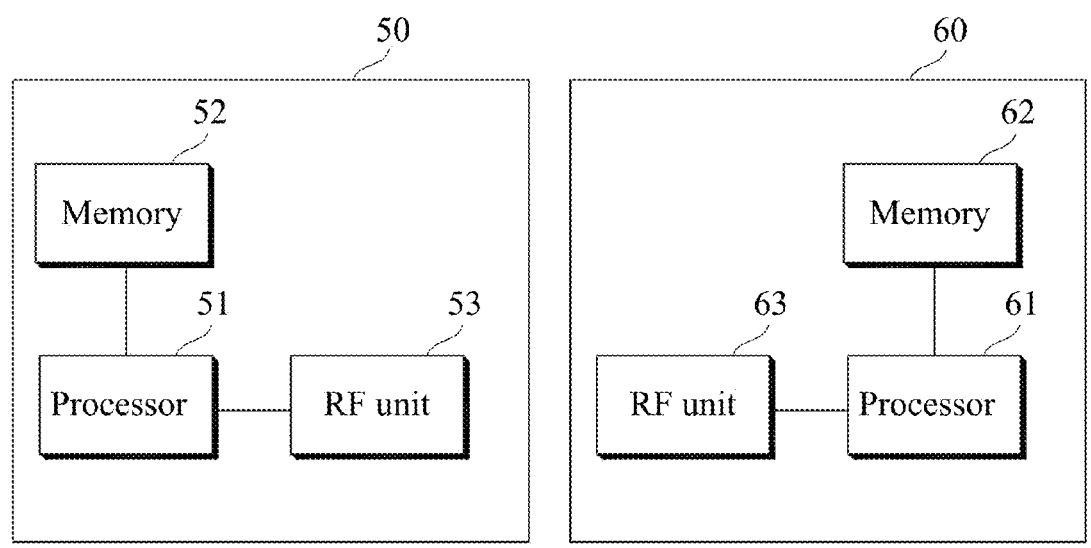
FIG. 16 is a block diagram showing the wireless communication system in which the embodiment of the present invention is implemented.

FIG. 16 is a block diagram showing the wireless communication system in which the embodiment of the present invention is implemented.

The base station 50 includes a processor 51, memory 52 and RF (radio frequency) unit 53. The memory 52 is connected to the processor 51, and stores various information for driving the processor 51. The RF unit 53 is connected to the processor 51, and transmits and/or receives radio signal. The processor 51 implements proposed functions, procedures and/or methods. A transmitter may be a part of the base station and the operation of the transmitter in the embodiments can be implemented by the processor 51. A receiver may be a part of the base station and the operation of the receiver in the embodiments can be implemented by the processor 51.

The wireless device 60 includes a processor 61, memory 62 and RF unit 63. The memory 62 is connected to the processor 61, and stores various information for driving the processor 61. The RF unit 63 is connected to the processor 61, and transmits and/or receives radio signal. The processor 61 implements proposed functions, procedures and/or methods. A receiver may be a part of the wireless device and the operation of the receiver in the embodiments can be implemented by the processor 61. A transmitter may be also a part of the wireless device and the operation of the transmitter in the embodiments can be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting data streams in a wireless communication system, comprising steps of:
performing Fourier transform for a data stream to generate a transformed stream;
repeating the transformed stream to generate a repeated stream;
mapping the repeated stream on a plurality of subcarriers to generate a transmission signal, the plurality of subcarriers selected by starting from a subcarrier having a predetermined index and hopping at a subcarrier interval; and
transmitting the transmission signal to a receiver,
wherein the predetermined index is given by the following equation, $$\left\lfloor \frac{i-1}{M'} \right\rfloor M'(L'-1) + i$$

where i is an index of user, M' is the subcarrier interval, L' is a number of the plurality of subcarriers.

2. The method of claim 1, wherein the step of mapping the repeated stream comprises steps of:
weighting the repeated stream based on a spectral weighting vector to generate a weighted stream; and
performing inverse Fourier transform for the weighted stream.

3. The method of claim 2, wherein the spectral weighting vector $f^{(i)}$ $f^{(i)}$ is determined by using the following equation, $$f_l^{(i)} = 0, \text{ if } \mathrm{rem}\left(l - \left\lfloor \frac{i-1}{M'} \right\rfloor M'(L'-1) - i, M'\right) \neq 0$$

$$f_L^{(i)}[l]^{\mathcal{H}} f_L^{(i)}[l] = 1, \forall l = 0, 1, \ldots, L-1$$

where, rem(a,b) is a remainder when a is divided by b, i is an index of user, M' is the subcarrier interval, L' is a number of the plurality of subcarriers, $f_l^{(i)}$ is a l-th element of $f^{(i)}$, $f_L^{(i)}[l]$ is defined as the following equation $$f_L^{(i)}[l] \triangleq \begin{bmatrix} f_l^{(i)} \\ f_{l+L}^{(i)} \\ \vdots \\ f_{l+L(M-1)}^{(i)} \end{bmatrix}.$$

4. The method of claim 1, wherein the subcarrier interval is larger than a coherence bandwidth of the wireless communication system.

5. The method of claim 1, wherein the subcarrier interval is determined based on a channel condition in the wireless communication system.

6. The method of claim 1, wherein a number of the plurality of subcarriers is determined based on a channel condition in the wireless communication system.

7. A base station for transmitting data streams in a wireless communication system, the base station comprising:
a radio frequency unit for receiving a radio signal; and
a processor, operatively coupled with the radio frequency unit, configured for:
performing Fourier transform for a data stream to generate a transformed stream;
repeating the transformed stream to generate a repeated stream;
mapping the repeated stream on a plurality of subcarriers to generate a transmission signal, the plurality of subcarriers selected by starting from a subcarrier having a predetermined index and hopping at a subcarrier interval; and
transmitting the transmission signal to a receiver,
wherein the predetermined index is given by the following equation, $$\left\lfloor \frac{i-1}{M'} \right\rfloor M'(L'-1) + i$$

where i is an index of user, M' is the subcarrier interval, L' is a number of the plurality of subcarriers.

8. The base station of claim 7, wherein the processor is configured for mapping the repeated stream by:
weighting the repeated stream based on a spectral weighting vector to generate a weighted stream; and
performing inverse Fourier transform for the weighted stream.

9. The base station of claim 8, wherein the spectral weighting vector $f^{(i)}$ is determined by using the following equation, $$f_l^{(i)} = 0, \text{ if } \mathrm{rem}\left(l - \left\lfloor \frac{i-1}{M'} \right\rfloor M'(L'-1) - i, M'\right) \neq 0$$

$$f_L^{(i)}[l]^{\mathcal{H}} f_L^{(i)}[l] = 1, \forall l = 0, 1, \ldots, L-1$$

where, rem(a,b) is a remainder when a is divided by b, i is an index of user, M' is the subcarrier interval, L' is a number of the plurality of subcarriers, $f_l^{(i)} f_l^{(i)}$ is a l-th element of $f^{(i)}$, $f_L^{(i)}[l]$ is defined as the following equation $$f_L^{(i)}[l] \triangleq \begin{bmatrix} f_l^{(i)} \\ f_{l+L}^{(i)} \\ \vdots \\ f_{l+L(M-1)}^{(i)} \end{bmatrix}.$$

10. The method of claim 7, wherein the subcarrier interval is larger than a coherence bandwidth of the wireless communication system.

11. The method of claim 7, wherein the subcarrier interval is determined based on a channel condition in the wireless communication system.

12. The method of claim 7, wherein a number of the plurality of subcarriers is determined based on a channel condition in the wireless communication system.

* * * * *